United States Patent
Otten (10) Patent No.: US 12,415,503 B2
(45) Date of Patent: Sep. 16, 2025

(54) SUSPENSION SYSTEM WITH COMPREHENSIVE PITCH STABILITY CONTROL

(71) Applicant: FORD GLOBAL TECHNOLOGIES, LLC, Dearborn, MI (US)

(72) Inventor: Erik Otten, Victoria (AU)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 18/252,000

(22) PCT Filed: Nov. 5, 2020

(86) PCT No.: PCT/US2020/059066
§ 371 (c)(1),
(2) Date: May 5, 2023

(87) PCT Pub. No.: WO2022/098357
PCT Pub. Date: May 12, 2022

(65) Prior Publication Data
US 2024/0017717 A1   Jan. 18, 2024

(51) Int. Cl.
*B60W 30/02* (2012.01)
*B60W 10/04* (2006.01)
*B60W 30/18* (2012.01)
*B60W 50/00* (2006.01)

(52) U.S. Cl.
CPC .......... *B60W 30/02* (2013.01); *B60W 10/04* (2013.01); *B60W 30/18109* (2013.01); *B60W 2050/0026* (2013.01); *B60W 2400/00* (2013.01); *B60W 2510/22* (2013.01); *B60W 2520/16* (2013.01); *B60W 2552/05* (2020.02); *B60W 2710/18* (2013.01)

(58) Field of Classification Search
CPC .......... B60W 30/02; B60W 30/18109; B60W 10/04; B60W 2552/05; B60W 2050/0026; B60W 2510/22; B60W 2520/16; B60W 2030/041; B60W 2422/40; B60W 2510/225; B60W 2520/10; B60W 2720/30; B60W 2720/403; B60W 10/18; B60W 10/184; B60W 40/11; B60T 8/1755; B60G 2300/07; B60G 2400/204; B60G 2400/252; B60G 2400/91; B60G 2401/28; B60G 2800/014; B60G 17/0195
USPC ......................................................... 701/82
See application file for complete search history.

(56) References Cited

U.S. PATENT DOCUMENTS

| | | | |
|---|---|---|---|
| 2005/0143877 A1* | 6/2005 | Cikanek | B60W 20/00 701/22 |
| 2010/0017058 A1 | 1/2010 | Lu et al. | |
| 2011/0114409 A1 | 5/2011 | Venton-Walters | |
| 2015/0203119 A1 | 7/2015 | Bird et al. | |

FOREIGN PATENT DOCUMENTS

GB     2511831 A *  9/2014  ............ B60K 28/16

* cited by examiner

*Primary Examiner* — Hung Q Nguyen
(74) *Attorney, Agent, or Firm* — Burr & Forman; Lorne Forsythe (57) ABSTRACT

A vehicle control system includes a plurality of sensors that determine ride height information of a vehicle, a sensor that determines pitch information for the vehicle, and a controller that selectively applies traction torque and braking torque to wheels of the vehicle based on vehicle speed, the pitch information and the ride height information.

20 Claims, 7 Drawing Sheets

FIG. 7

SUSPENSION SYSTEM WITH COMPREHENSIVE PITCH STABILITY CONTROL

TECHNICAL FIELD

Example embodiments generally relate to vehicle suspension and, more particularly, relate to a suspension system that is capable of improving pitch stability and acceleration capability for driving in environments with repetitive undulations by providing automatically generated propulsive and braking interventions.

BACKGROUND

Vehicles commonly employ suspension systems including shock absorbers (or simply "shocks") or other vibration damping equipment that is designed to keep wheels in contact with the road surface as much as possible, while also improving ride quality. The shocks generally resist compression and rebound with damping forces that are applied over a range of travel of a piston rod. Pitch (i.e., oscillation about a lateral axis of the vehicle) is one phenomenon that shocks are used to address.

Once a typical vehicle is designed and the damping components have been selected, the components often operate passively to provide the damping for which they are designed. Some suspension systems may incorporate so called active suspension, which may change the firmness of shock absorbers based on different road conditions or physically raise or lower the chassis independently at each wheel. However, vehicle suspension technology remains an area of interest, particularly in relation to providing the ability to enable drivers to dynamically respond to different driving conditions and maintain high degrees of confidence and enjoyment of the driving experience.

BRIEF SUMMARY OF SOME EXAMPLES

In accordance with an example embodiment, a vehicle control system for improving traction of a vehicle may be provided. The vehicle control system may include a plurality of sensors that determine ride height information of a vehicle, a sensor that determines pitch information for the vehicle, and a controller that selectively applies traction torque and braking torque to wheels of the vehicle based on vehicle speed, the pitch information and the ride height information.

In another example embodiment, a method of automatically applying traction control for a suspension system of a vehicle may be provided. The method may include determining proximity to pitch resonance based on pitch information, ride height information and vehicle speed for the vehicle. The method may further include determining traction torque or braking torque to apply to increase proximity to pitch resonance, and applying the traction torque or the braking torque to selected wheels of the vehicle responsive to counteract pitch.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Repetitive sets of relatively large undulations (sometimes referred to as "whoops") can put shock absorbers or dampers into ranges in which damping forces being cyclically applied may provide a form of feedback or excitation into the system that can build to the point of resonance at certain speeds. This can create a speed, or even a range of speeds, at which pitch resonance may be approached for transit over the whoops. Operators will tend respond to any experience that tends toward pitch resonance by manually reducing speed dramatically until its effects cannot be felt. However, very experienced or professional drivers may develop skills for manually controlling vehicle speed in ways that maximize their ability to maintain speed through the whoops. These skills are beyond the capability of most drivers, and are often employed in any case in racing vehicles or specially designed off-road vehicles.

Meanwhile, example embodiments may provide a degree of electronic pitch stability control that may obviate any need for drivers to manually take action to avoid pitch resonance or second order pitch resonance, which may also occur at double the speed at which pitch resonance occurs, and therefore may have similar effects. In this regard, at second order pitch resonance, the wheel may not have contact with the road so the tire cannot transfer any load into the suspension for that period of time. For purposes of this disclosure the term "pitch resonance" should be understood to refer to both first and second order pitch resonance.

Some example embodiments described herein may provide an improved suspension system that employs a control system that is capable of automatically taking action that avoids pitch resonance. In particular, example embodiments may apply strategically timed propulsion and/or brake intervention (generally referred to collectively as torque interventions) aimed at being in anti-phase with pitch resonance. By applying torque interventions that counter or are out of phase with pitch resonance, pitch resonance can be avoided. By avoiding pitch resonance, contact between the wheels and the ground can be increased in even the most challenging of contexts, such as riding over whoops. As a result, vehicle performance and driver satisfaction may also be improved. In this regard, for example, speed and handling may be maximized over whoops or other challenging terrain.

Figure 1:
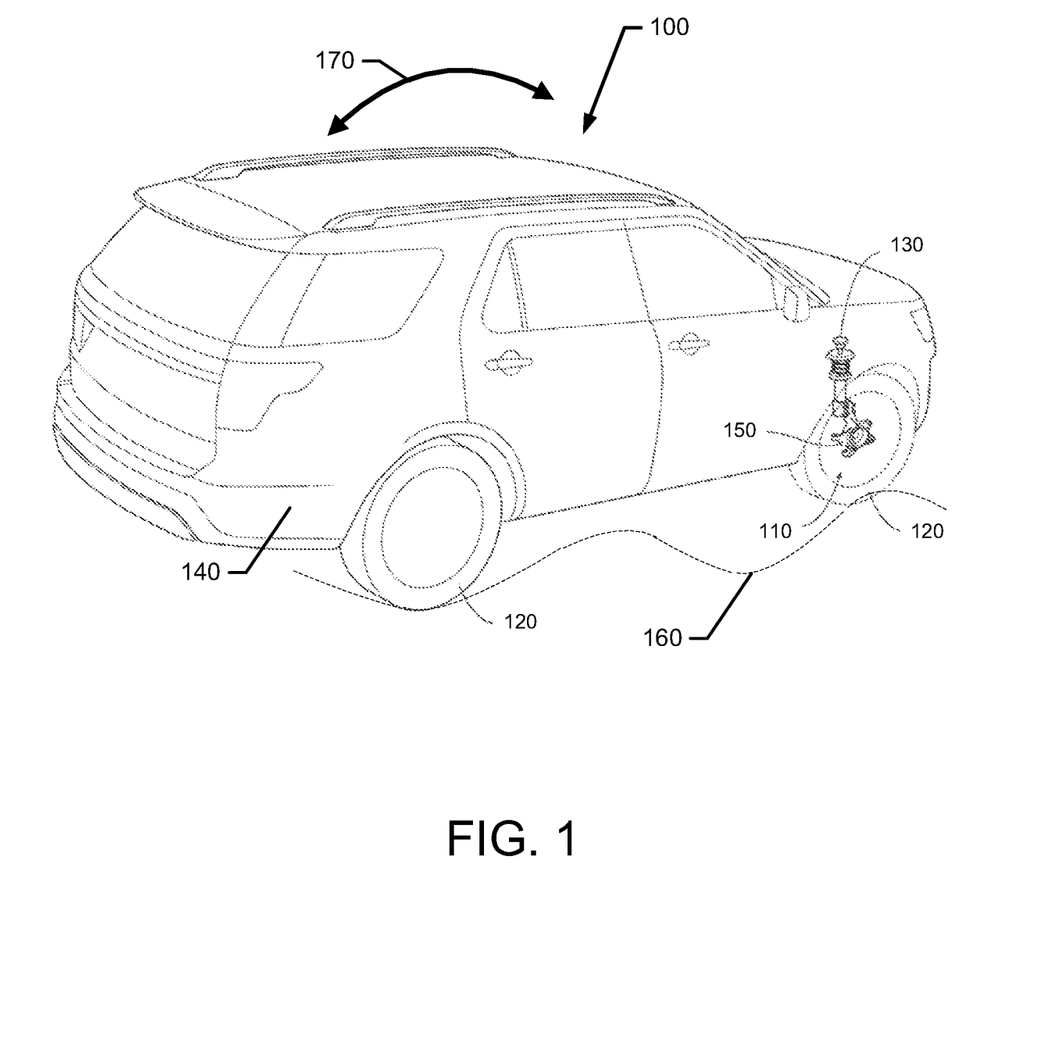
FIG. 1 illustrates a perspective view of a vehicle encountering undulating terrain and certain components of a suspension system of the vehicle in accordance with an example embodiment.

FIG. 1 illustrates a perspective of a vehicle 100 employing a suspension system 110 of an example embodiment. The suspension system 110 includes a plurality of wheels 120 in contact with the ground, and a damper 130 (e.g., a shock absorber or shock) disposed between each one of the wheels 120 and a body 140 or chassis of the vehicle 100. In some cases, the wheel 120 may be operably coupled to the damper 130 via a steering knuckle 150. Additional links may also be provided between the chassis and the steering knuckle 150 to stabilize the wheel 120, but such links are outside the scope of example embodiments.

As shown in FIG. 1, undulating terrain 160 (or whoops) that is repetitive in nature may be encountered by the vehicle 100. The body 140 of the vehicle 100 may tend to move up and down pitching cyclically as shown by double arrow 170 as the undulating terrain 160 is traversed. The pitching may correspondingly cause cyclic compression and extension of the damper 130 of the suspension system 110, as the damper 130 attempts to dampen out the motion. Because the damper 130 necessarily has a limited amount of linear travel for the piston rod therein, a certain degree of harshness could be encountered when the limit is reached at either end. To reduce this harshness, and provide a smoother ride for passengers, the damper 130 may provide additional hydraulic force near the respective limits. The additional hydraulic force may, however, provide positive feedback into the system. At certain speeds, as noted above, the positive feedback could excite the system toward pitch resonance, which would result in poor ride quality and stability over the corresponding speed or range of speeds where the pitch resonance is encountered.

Figure 2:
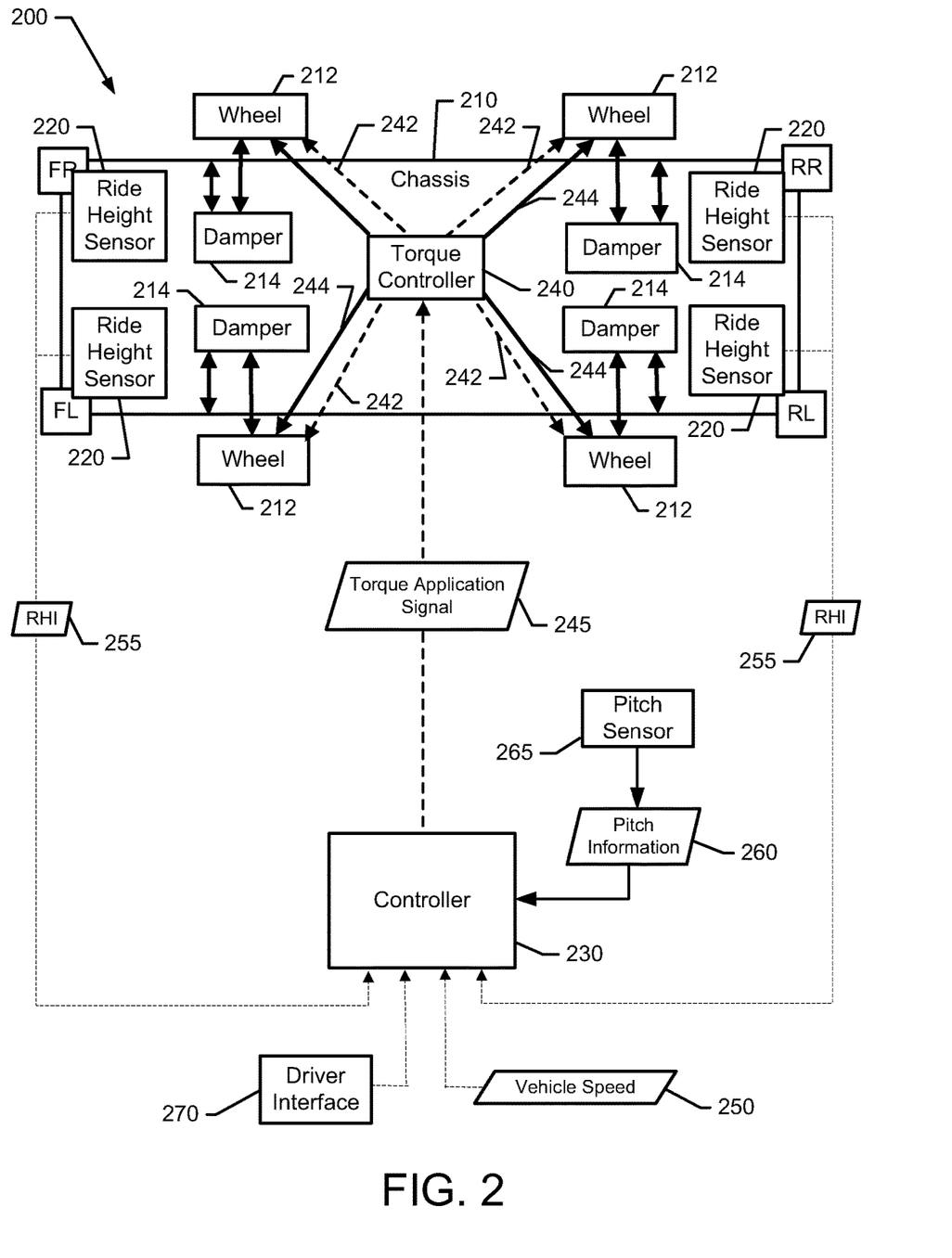
FIG. 2 illustrates a block diagram of a traction control system in accordance with an example embodiment.

To avoid pitch resonance, and maximize the capability example embodiments may employ a traction control system 200. An example is shown in FIG. 2, which illustrates a block diagram of the traction control system 200. As shown in FIG. 2, a vehicle chassis 210 may be provided with wheels 212. The wheels 212, and corresponding instances of a damper 214 for each respective one of the wheels 212 may form part of a suspension system of the vehicle on which the traction control system 200 is deployed.

In an example embodiment, the traction control system 200 may include a ride height sensor 220 associated with each wheel 212 and damper 214. In this regard, an instance of the ride height sensor 220 may be provided in or near each corner of the chassis 210 (e.g., front-right (FR), front-left (FL), rear-right (RR) and rear-left (RL)). The ride height sensors 220 may be configured to determine a height of the chassis 210 (or another reference point on the vehicle) relative to the ground or a reference location that is generally assumed to correspond to the ground. The ride height sensors 220 may be embodied in any of a number of different ways including via the use of lasers or other optical sensing means. However, any suitable ride height sensor could be employed.

The ride height sensors 220 may be operably coupled to a controller 230, which may be an electronic control unit (ECU) of the vehicle, or a separate instance of processing circuitry comprising a processor and memory. The controller 230 may be configured (e.g., via hardware, software or a combination of hardware and software configuration or programming) to receive pitch information from the ride height sensors 220 (and sometimes also from other components) and strategically apply torque interventions (e.g., braking torque interventions and/or propulsive torque interventions) to the wheels 212 (e.g., individually, in pairs, or as a group) as described in greater detail below.

As shown in FIG. 2, each of the wheels 212 may be operably coupled to a torque controller 240. The torque controller 240 may be configure to apply braking torque interventions 242 and/or propulsive torque interventions 244 (also called traction torque) to the wheels 212 as described in greater detail below. In this regard, for example, the torque controller 240 may receive a torque control signal 245 from the controller 230 and apply one or both of the braking torque interventions 242 and the propulsive torque interventions 244 to the wheels 212 (e.g., individually, in pairs or as a group) based on the torque control signal 245.

In an example embodiment, the torque application signal 245 may be generated by the controller 230 during vehicle pitch based on vehicle speed 250 and ride height information (RHI) 255 generated by the ride height sensors 220. In some cases, the controller 230 may also use pitch information 260 generated by a pitch sensor 265. That said, in some cases, the pitch information 260 may also be derived from the ride height information 255, so the ride height sensors 220 could act as the pitch sensor 265 (or augment operation of the pitch sensor 265) in some embodiments.

In some examples, the torque application signal 245 may be generated in a particular, driver-selected operational mode (e.g., an off-road, traction control (OTC) mode. Thus, for example, a user interface (or driver interface 270) may be provided at the steering wheel, dashboard, center console, armrest or any other console or location conveniently accessible to the driver. The user interface may include a button, switch, lever, key (soft or hard) or other operable member that can be actuated to activate the controller in the OTC mode. When the OTC mode is activated, the controller 230 may be enabled to automatically monitor conditions to determine whether (and when) to apply the torque application signal 245 as described herein.

In an example embodiment, the controller 230 may be configured to execute a traction control algorithm stored at or accessible to the controller 230. In this regard, for example, the controller 230 may be configured to receive the ride height information 255 from each of the ride height sensors 220 along with vehicle speed 250 and the pitch information 260. The controller 230 may then execute the traction control algorithm based on such information. The traction control algorithm may configure the controller 230 to determine pitch motion generally, but also when such pitch motion may be approaching resonance. The controller 230 may then initiate propulsive or braking torque to counter pitch resonance via the torque application signal 245. As such, for example, the controller 230 may determine whether and when to apply the torque application signal 245

(e.g., on a wheel-by-wheel basis, for a pair of wheels, or for the entire group of wheels 212). In other words, the traction control algorithm may include programming for determining, in real time or near real time, the conditions at each respective one of the wheels 212 in the context of the overall situation of the vehicle, and provide traction control inputs in the form of brake and/or propulsive torque interventions to either groups/pairs or the individual respective ones of the wheels 212 in order to maximize stability and traction with respect to avoidance of pitch resonance. As such, the torque application signal 245 provided to the brake controller 240 may indicate which individual one of the wheels 212 is to have brake forces or propulsive forces applied thereto in order to counter the pitch motion otherwise being experienced.

Based on the ride height information, pitch information, wheel speed and acceleration, the controller 230 may also be configured to make predictions regarding rebound positions and amount of time that a corresponding wheel may not be in contact with the road. The controller 230 may also be configured to take kinematic effects into consideration for the particular type of suspension system employed in either front suspension, rear suspension or both. For example, pitch and/or yaw acceleration of the body, may be counter balanced by brake or propulsive torque interventions that may be different left to right and/or front to back in order to stabilize the vehicle in yaw and/or pitch when pitch resonance occurs. Normal dynamic stability control (DSC) systems may be too slow to intervene when there is no contact between the wheel and road. However, the fact that the controller 230 may be configured to predict periods of no contact may create a significant advantage in terms of response time. Thus, for example, the controller 230 may perform an intervention based on a prediction regarding when a period of no contact between wheel and road may occur (e.g., ride height sensor jounce data may suggest that a wheel went so deep into a jounce bumper that rebound damping could not sufficient damp out the rebound motion and thereby cause the wheel to leave the road).

Figure 3:
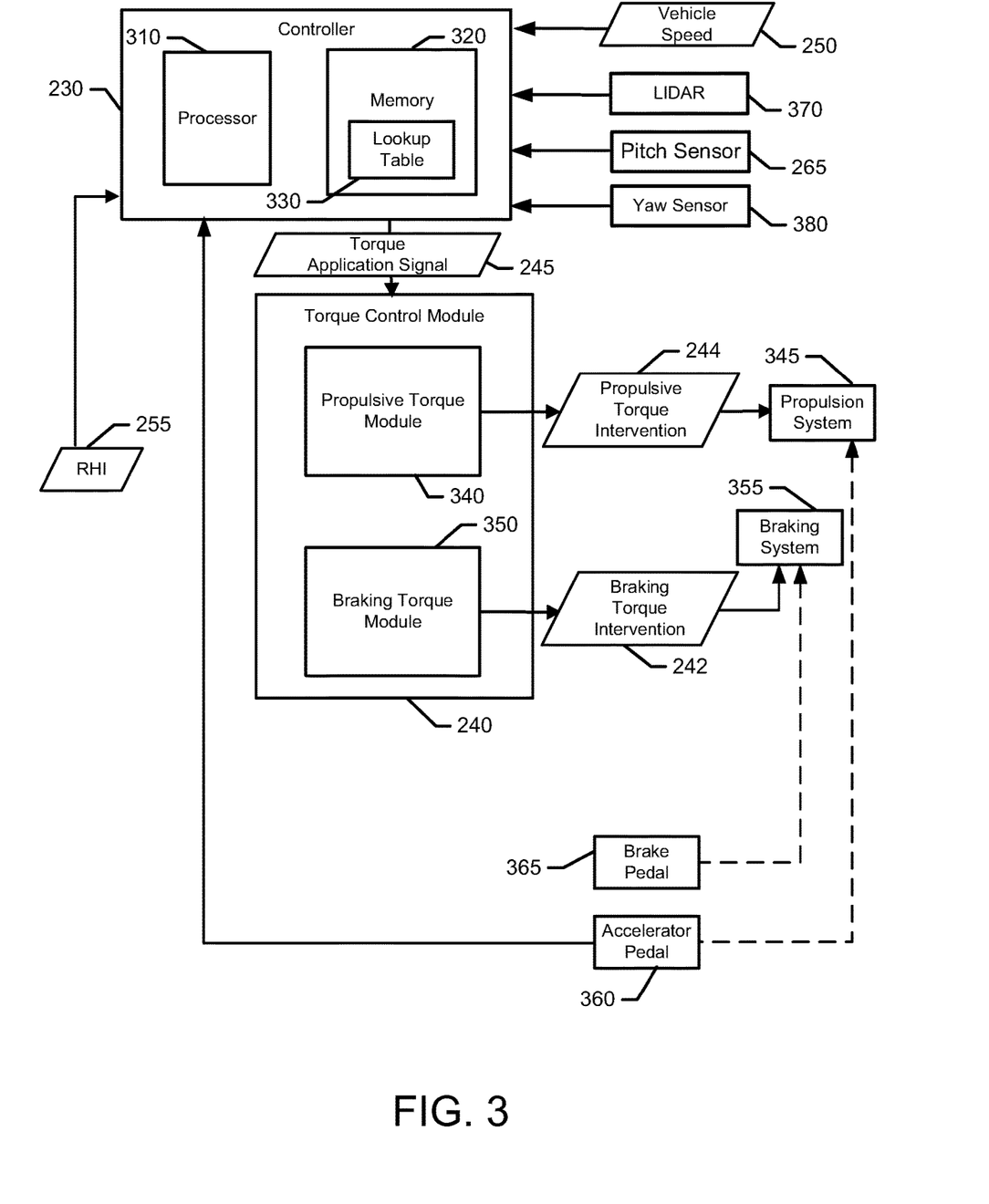
FIG. 3 is a block diagram of various components of the traction control system in greater detail in accordance with an example embodiment.

FIG. 3 illustrates a block diagram of the controller 230 and torque controller 240 of an example embodiment in greater detail. As shown in FIG. 3, the controller 230 may include a processor 310 and memory 320. The memory 320 may store a lookup table 330. The lookup table 33 may, for example, include speed values, pitch values and ride height values for each of the wheels 212, and corresponding indications of whether to apply brake or propulsive forces and perhaps also how much brake or propulsive force to apply (e.g., via the torque application signal 245). Thus, for example, the lookup table 330 may be entered based on the ride height information 255, the pitch information 260 and the vehicle speed 250 to determine whether and when to generate the torque application signal 245 (and for which wheel(s) 212). In some examples, the controller 230 may be configured to examine phasing of pitch calculations made from ride height information 255 associated with the ride height sensors 220 and the pitch information 260. Phasing of the pitch calculations versus the pitch from the vehicle may be calculated by the controller 230 in order to determine pitch resonance.

As shown in FIG. 3, the torque control module 240 may include a propulsive torque module 340 configured to interface with a propulsion system 345 of the vehicle and a braking torque module 350 configured to interface with a braking system 355 of the vehicle. The propulsive torque module 340 may be configured to generate the propulsive torque interventions 244 to the propulsion system 345 to cause propulsive torque to be applied to one wheel 212, pairs of wheels (front or rear) or all wheels in amounts and with timing determined by the controller 230 based on the information provided in the lookup table 330 to counteract pitch resonance.

In some examples, each of the wheels 212 may have corresponding brakes that are part of the braking system 355. The brakes may be friction brakes, regenerative brakes, or any other form of braking device, and may be operably coupled to the torque controller 240 (or more specifically the braking torque module 350). The braking torque module 350 may be configured to interface with the brakes to provide braking signals for the application of braking forces by the brakes at any or all of the individual instances of the brakes (e.g., at each wheel 212). In an example embodiment, the braking torque module 350 may operate responsive to one or more triggers or initiating events. Although many different triggers or initiating events could activate the braking torque module 350 to cause the brake controller to provide braking signals to the brakes, example embodiments provide that at least one such trigger or initiating event is receipt of a torque application signal 245 from the controller 230 (and more specifically the braking torque intervention 242 from the braking torque module 350). In some cases, further post-processing of the data provided by the ride height sensors 220 (e.g., wheel vertical speed and wheel acceleration) may also be performed by the controller 230. The braking torque intervention 242 may therefore be a signal (mechanical, electrical or otherwise) to the braking system 355 to activate brakes for a corresponding (or selected) wheel 212. Notably, the operator or driver may independently operate the brake pedal 365, and if so, the input of the brake pedal 365 that is manually provided may be additive with any automatic braking provided by the torque control module 240.

The propulsion system 345 may normally take input from an accelerator pedal 360, which is actuated by the driver to dictate the amount of propulsive force to be applied at the wheels 212 (e.g., via the engine or motor of the vehicle). However, when the OTC mode is selected, the controller 230 may also provide propulsive input. Thus, for example, the driver's intent to accelerate may therefore be communicated to the propulsion system 345 both directly and indirectly (e.g., via the controller 230 and/or torque control module 240). Like the braking system 355, which may normally take input from the brake pedal 365, which is actuated by the driver, any input to the propulsion system 345 in the OTC mode is also additive to the manual pedal inputs provided by the driver. Thus, braking torque interventions 242 and propulsive torque interventions 244 may occur independent of the actuation or position of the brake pedal 365 and the accelerator pedal 360 when instructed by the controller 230. While the driver may augment the traction control system 200 with operation of the brake pedal 365 and/or accelerator pedal 360, the traction control system 200 otherwise operates independently of the inputs provided via the brake pedal 365 and the accelerator pedal 360 when OTC mode is selected.

In some cases, the controller 230 may be configured to execute the traction control algorithm on as little information as the vehicle speed 250 and the ride height information 255 (e.g., since the pitch information 260 may be derived from ride height information 255). However, in other cases, as noted above, the pitch information 260 may be provided by a dedicated sensor (e.g., pitch sensor 265). The pitch sensor 265 may be embodied as a sensor such as a gyro specifically configured to detect vehicle rotation (i.e., pitch) about a transverse axis. The pitch sensor 265 may further enable direct sensing of whether the front or rear suspension is phasing in or out of phase with pitch motion. This additional information may further inform the controller 230 with regard to susceptibility to providing excitation toward resonance, and may be used to apply braking forces and/or propulsive torque forces at specific stages of either or both compression and rebound as described herein.

In some embodiments, still other additional information may also be used to inform the controller 230 as to the current situation (from a traction control stability perspective) to enable more informed or accurate decision making regarding the application of the torque application signal 245. For example, in some cases, a lidar detector 370 may be added for road surface detection or other terrain information. Information regarding the road surface or terrain on which the vehicle is operating may further be included in determinations made by the controller 230 with regard to determining whether and when to provide the torque application signal 245. In still other examples, a yaw sensor 380 may be added to detect yaw (i.e., rotation of the vehicle about a vertical axis). The existence (and degree) of yaw may impact stability of the vehicle, so by considering the generation of the torque application signal 245 also in light of the amount of yaw being experienced, individual wheels 212 may receive brake forces that may tend to counteract or reduce the amount of yaw being experienced by the vehicle.

Figure 4:
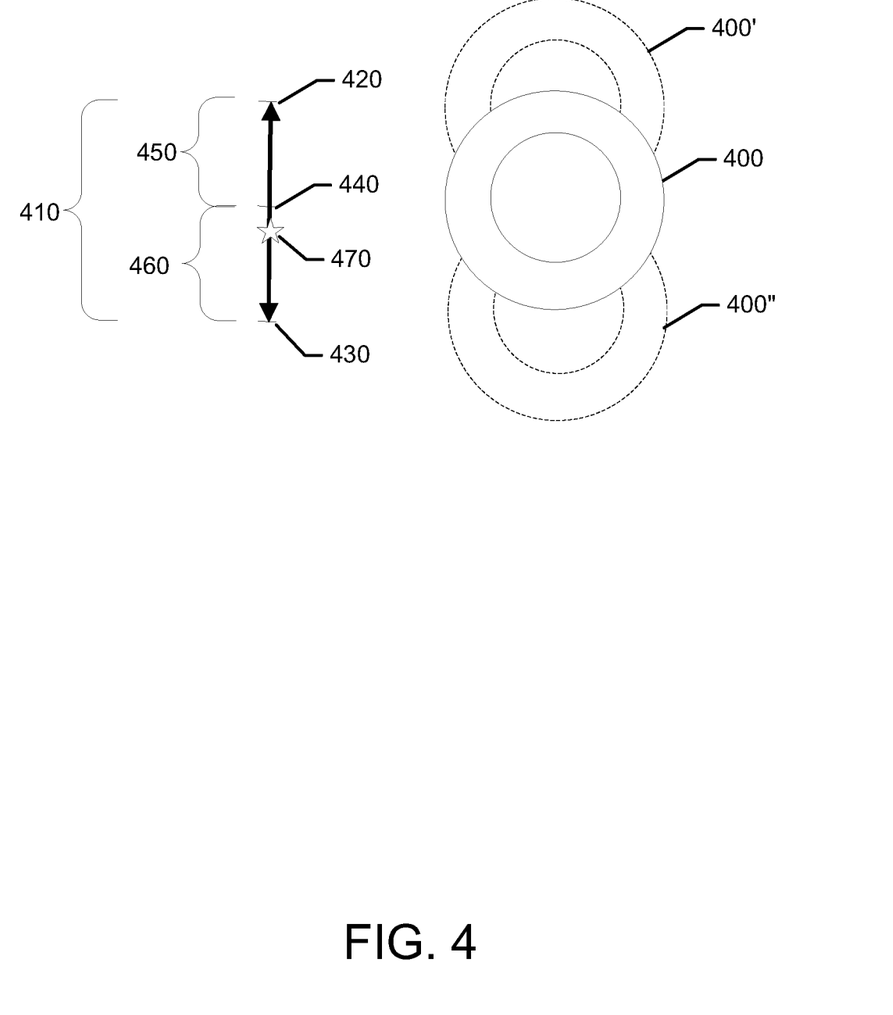
FIG. 4 illustrates a range of vehicle wheel absolute positions and certain reference points relative to the range in accordance with an example embodiment.

In some embodiments, as noted above, vehicle speed 250 and ride height information 255 may be used to enter the lookup table 330, or otherwise be used as the basis by which the controller 230 determines whether to generate the torque application signal 245 (and for what wheels 212). However, in some examples, the ride height information 255 may include, or be used to calculate or determine, certain other information that may be used as a basis for activity by the controller 230. For example, the ride height information 255 may include an indication of absolute position of a corresponding one of the individual wheels 212 relative to a range of travel of the wheel 212. In this regard, for example, FIG. 4 illustrates, in solid lines, a wheel 400 at a normal ride height. The same wheel at a position of full compression 400' and at a position of full rebound 400" is also shown in dashed lines. Thus, a range of wheel travel 410 may be defined from max compression 420 to max rebound 430. A motion transition point 440 may also be defined to distinguish between a compression zone 450 (where the suspension system and damper of the wheel 400 is in compression) and a rebound zone 460 (where the suspension system and damper of the wheel is in rebound). The ride height information 255 may therefore show (instantaneously) the current ride height of the vehicle or the current absolute position 470 of the wheel 400 relative to the range of wheel travel 410. In other words, the ride height information 255 may indicate to the controller 230 exactly where each wheel is currently and instantaneously located within its own range of motion and possible locations. The controller 230 may then be configured to generate the torque application signal 245 at strategic times (or locations) within either a compression cycle, a rebound cycle, or based on proximity to the motion transition point 440 or to either of the max compression 420 and max rebound 430 locations. This gives the controller 230 a unique ability to understand where each wheel is in relation to the ground and each other to apply braking forces to manage avoidance of pitch resonance and otherwise maximize pitch stability. For example, a wheel tending toward the location of max rebound 430 may have a braking force (e.g., via the braking torque intervention 242) applied to tend the wheel instead toward compression and thereby counteract rebound forces that could possibly otherwise build to resonance at certain speeds where pitch resonance may otherwise be an issue.

The ride height information 255 may also or alternatively be useful for determining damper speed, damper acceleration, or where the damper piston is relative to the damper pistons full range of motion. Damper force and spring force may also be inferred based on ride height information 255, or may be measured and received from the dampers themselves. Regardless of how received and generated, information such as damper speed, damper acceleration, damper force or spring force may also be used in connection with entering a lookup table or modifying results of such use of a lookup table. Data relating to current absolute position 470, motion transfer point 440 (or proximity to either such points), damper speed, damper acceleration, spring force and/or damper force may therefore be used as bases for determining to initiate the brake application signal 245 to define the existence of braking force application, the amount of braking force application and/or the timing of braking force application.

As payload increases, pitch inertia also increases. Therefore, it may be advantageous to provide a capability to adjust suspension characteristics to match current payload status. In some examples, the controller 230 may be configured for applying strategic braking with the ability to account for payload. In such a system, the ride height sensors 220 may also provide information that is indicative of the current loading of the vehicle. Based on the current loading, the vehicle may already be closer to max compression 420, and the pitch characteristics may be altered accordingly. Thus, the pitch control algorithm may modify brake force application on a wheel-by-wheel basis in consideration of current vehicle loading conditions. In some cases, a separate instance of lookup table may be provided for each of a number of different ranges of loading conditions from no load to full load.

As can be appreciated from the description above, the ride height sensors 220 provide an ability to know ride height information 255 that is indicative of current absolute position 470 of the wheel 400 (for each wheel) at each instant in time. When combined with pitch information from the pitch sensor 265, the controller 230 may be in a position to understand (e.g., based on data in the lookup table 330) exactly how the pitch information and the ride height information 255 are currently interacting for the vehicle speed 250. Moreover, the controller 230 may also be configured to extrapolate or anticipate future wheel positions (e.g., including when the wheel 400 may reach the motion transition point 440 or to either of the max compression 420 and max rebound 430 if unchecked). The controller 230 may then generate the torque application signal 245 to prescribe the propulsive torque module 340 of the torque control module 240 to generate the propulsive torque intervention 244 to the propulsion system 345, or prescribe the braking torque module 350 of the torque control module 240 to generate the braking torque intervention 242 to the braking system 355 to counteract or cancel out motions that would otherwise tend the vehicle toward pitch resonance.

Figure 5A:
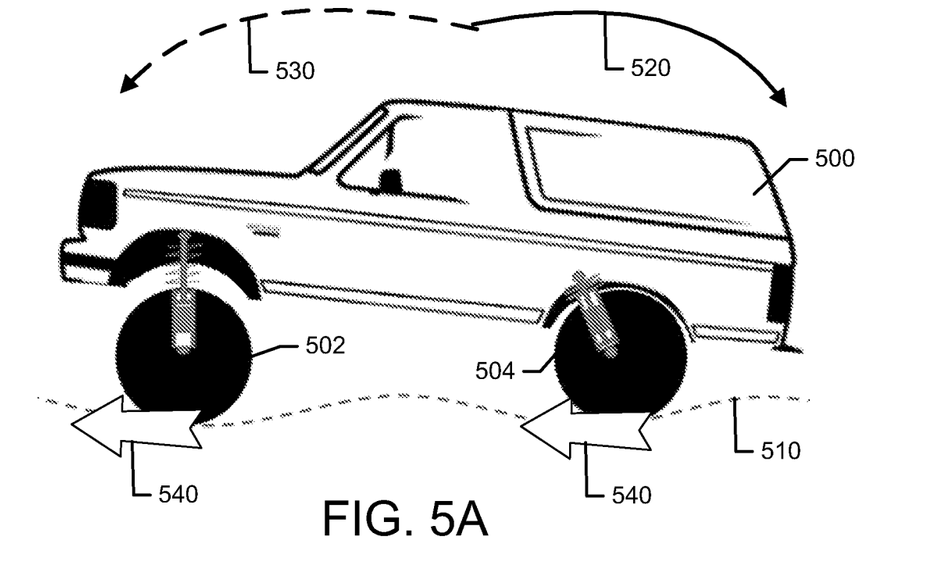
FIG. 5A illustrates a scenario in which braking interventions are inserted for traction control in accordance with an example embodiment.
Figure 5B:
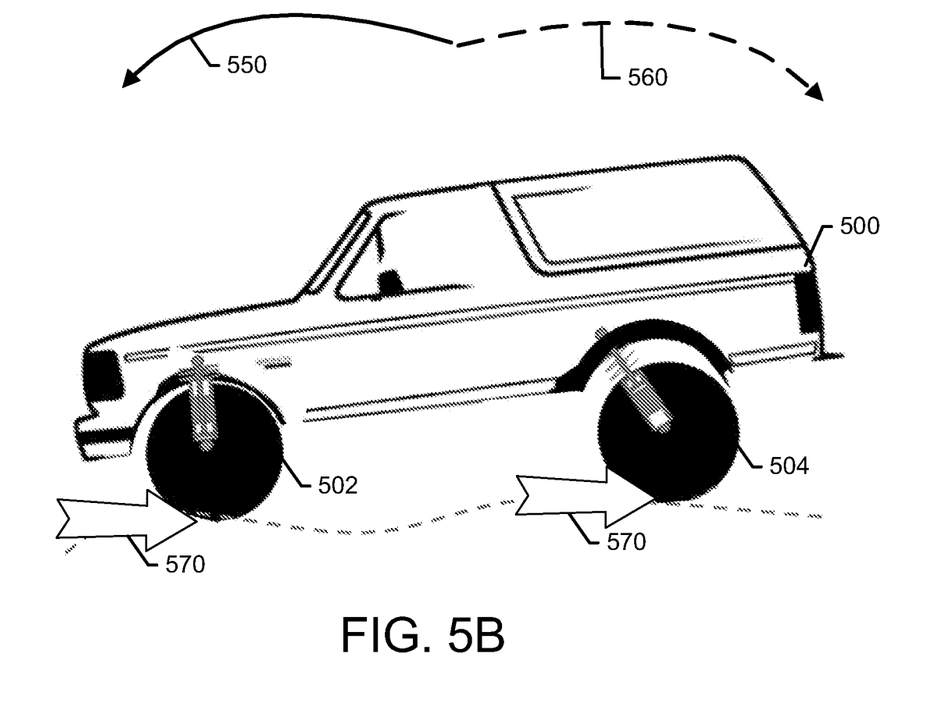
FIG. 5B illustrates a scenario in which propulsive interventions are inserted for traction control in accordance with an example embodiment.

FIGS. 5A and 5B show examples of the application of the braking torque intervention 242 (in FIG. 5A) and the propulsive torque interaction 244 (in FIG. 5B) according to an example embodiment. In this regard, as shown in FIG. 5A, the vehicle 500 may be passing over undulating terrain 510. The vehicle 500 may receive pitch information indicating a direction and to counteract the rearward pitch motion 520 and avoid pitch resonance, a forward pitch motion 530 may be desirable to insert or induce. Accordingly, the controller 230 may determine that braking forces 540 should be inserted (responsive to application of the braking torque intervention 242 described above). The braking forces 540 may generate the forward pitch motion 530 to cancel or at least reduce the impact of the rearward pitch motion 520. In this example, the braking forces 540 are applied equally to front and rear wheels of the vehicle 500. However, it should be appreciated that different magnitudes could be applied to each of the front wheels 502 and rear wheels 504, respectively, or the braking forces 540 could be applied to only one of the front wheels 502 and rear wheels 504, and not the other.

FIG. 5B illustrates an alternative (and opposite) scenario. In this regard, the vehicle 500 passes over the undulating terrain 510 and is at a position (and speed) at which the pitch information and ride height information indicate a direction and magnitude of forward pitch motion 550 of the vehicle 500. To counteract the forward pitch motion 550 and avoid pitch resonance, a rearward pitch motion 560 may be desirable to insert or induce. Accordingly, the controller 230 may determine that propulsive forces 570 should be inserted (responsive to application of the propulsive torque intervention 244 described above). The propulsive forces 570 may generate the rearward pitch motion 560 to cancel or at least reduce the impact of the forward pitch motion 550. In this example, the propulsive forces 570 are applied equally to front and rear wheels of the vehicle 500. However, it should be appreciated that different magnitudes could be applied to each of the front wheels 502 and rear wheels 504, respectively, or the propulsive forces 570 could be applied to only one of the front wheels 502 and rear wheels 504, and not the other.

The controller 230 may continuously monitor the pitch information 260 and ride height information 255 relative to vehicle speed 250 to determine when the torque application signal 245 should responsively or predictively be applied. As such, for example, the controller may monitor the pitch information 260 and ride height information 255 relative to vehicle speed 250 to determine current proximity of the wheel 400 relative to the motion transition point 440 or to either of the max compression 420 and max rebound 430 or to determine an estimated time of a future proximity of the wheel 400 relative to the motion transition point 440 or to either of the max compression 420 and max rebound 430. The controller 230 may then calculate a corresponding reactive or predictive torque application signal 245 aimed at avoiding pitch resonance.

Figure 6:
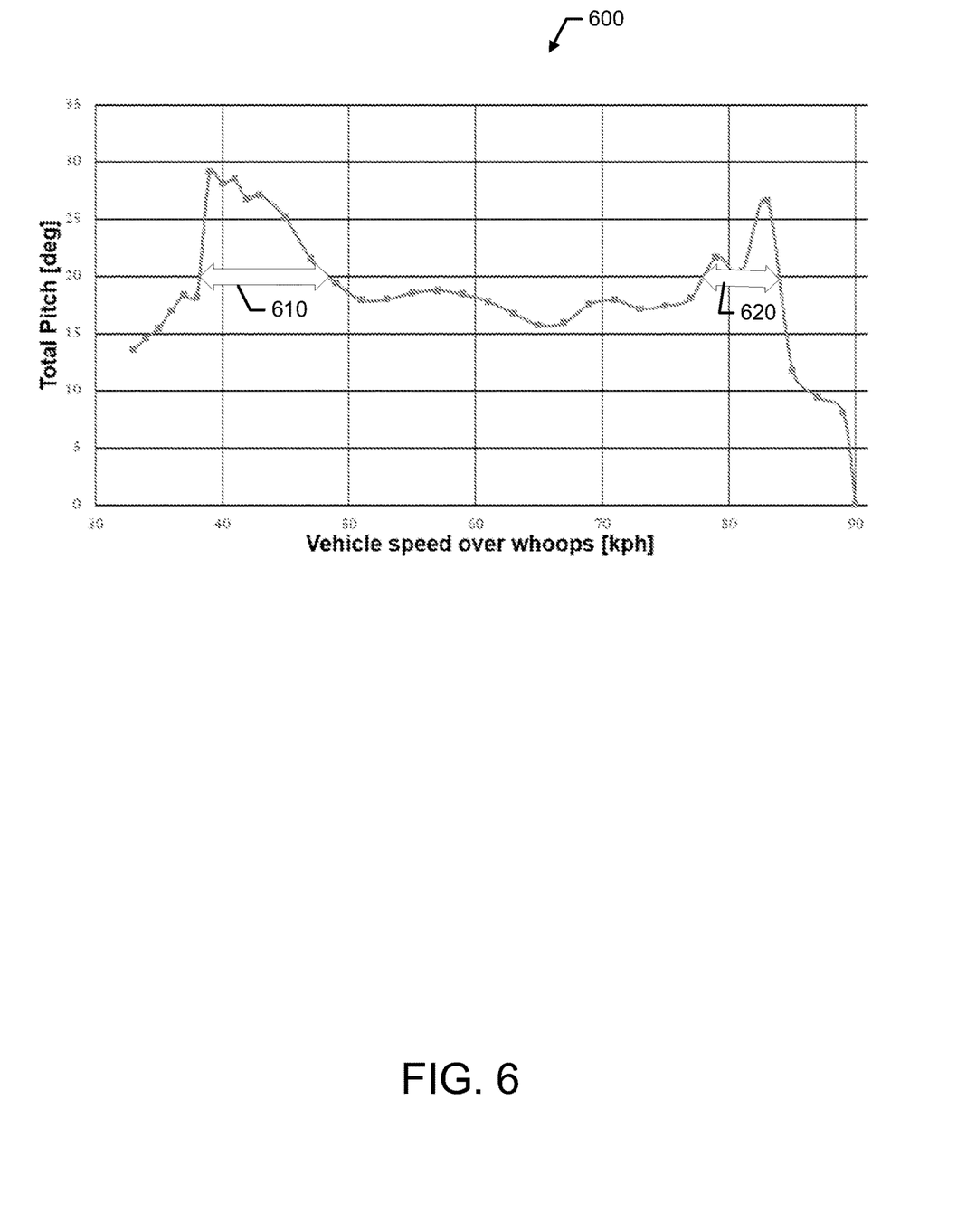
FIG. 6 illustrates a plot of pitch versus speed and corresponding enabling ranges in which example embodiments may be practiced.

FIG. 6 illustrates a plot 600 of total pitch versus vehicle speed for a hypothetical vehicle. Thus, FIG. 6 may be understood to be modeled data generated for the hypothetical vehicle. As shown in FIG. 6, total pitch reaches maximum levels at around 40 kph (first order pitch resonance) and just over 80 kph (second order pitch resonance). The controller 230 may only insert torque application signals 245 in certain operational ranges where pitch information indicates potential for proximity to pitch resonance. Thus, for example, a first operational range 610 may be defined for a combination of speed and pitch over which the controller 230 may generate the torque application signal 245 may be computed and/or applied. Due to second order pitch resonance, a second operational range 620 may also be defined for a combination of speed and pitch over which the controller 230 may generate the torque application signal 245 may be computed and/or applied. Outside the first operational range 610 and the second operational range 620, the controller 230 may either not perform any calculations for the torque application signal 245, or at least may not be enabled to automatically apply the torque application signal 245.

Of course, the controller 230 also neither calculates nor applies the torque application signal 245 when the OTC mode has not been selected. However, in some cases, the controller 230 may also be prevented from providing the torque application signal 245 when the vehicle is not in an off-road environment. Accordingly, for example, the lidar detector 370 may detect the surface over which the vehicle operates, and only enable the controller 230 to calculate or apply the torque application signal 245 when the surface is an off-road surface. As yet another alternative, current vehicle location may be determined (e.g., via global positioning system (GPS) information), and the torque application signal 245 may not be calculated or applied when the current vehicle location does not indicate that the vehicle is off-road.

Figure 7:
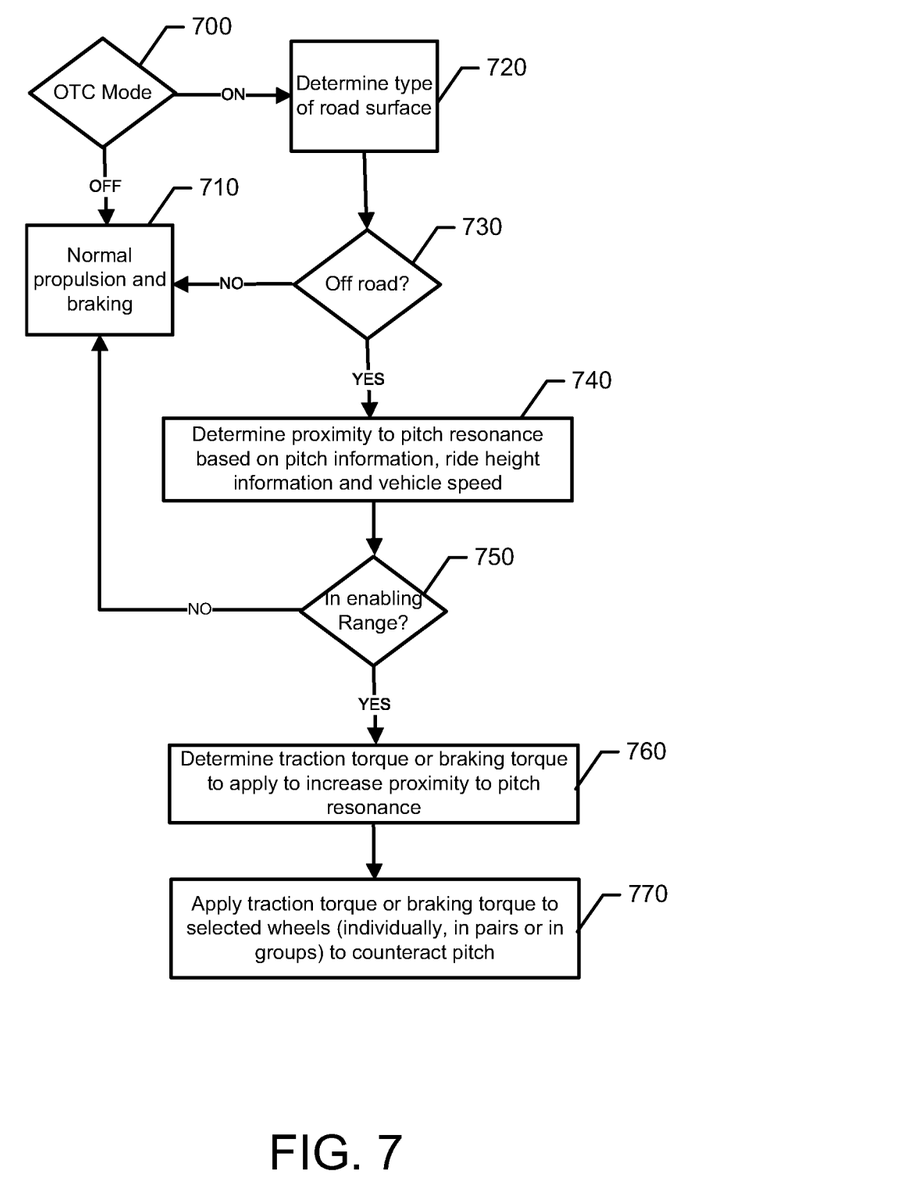
FIG. 7 illustrates a block diagram of a method of automatically applying traction control for a suspension system in accordance with an example embodiment.

The modeled data of FIG. 6 may be used in connection with the operation of the controller 230 as described above. In this regard, for example, the controller 230 may include the modeled data (or the lookup table 330 or other information used by the controller 230 may find its basis at least in part in the modeled data for the vehicle). The controller 230 may therefore be configured to execute a method of automatically applying traction stability control for a suspension system. FIG. 7 illustrates a block diagram of such a method. The method may include determining whether OTC mode is on or off in operation 700. If OTC mode is off, then normal propulsion and braking (e.g., via the brake pedal 365 and accelerator pedal 360) may be provided at operation 710. However, if OTC mode is on, then a determination may be made as to the type of road surface at operation 720. If, as determined at operation 730, the road type is not off-road, then normal propulsion and braking may be provided at operation 710. If the road type is off-road, then a determination may be made as to proximity to pitch resonance at operation 740 based on pitch information, ride height information and vehicle speed. The system may be further configured to only operate when in certain ranges of proximity to pitch resonance (e.g., certain combinations of speed and pitch). When in such ranges (which may be referred to as enabling ranges), a determination may further be made as to the traction torque (e.g., propulsive torque intervention) or braking torque to apply to increase proximity to pitch resonance (or otherwise prevent occurrence of pitch resonance) at operation 760. However, if not within the enabling range (or one of the enabling ranges), then normal propulsion and braking may again be provided at operation 710. After operation 760, the traction torque or braking torque may be applied to selected wheels (e.g., individually, in pairs or in groups) to counteract pitch at operation 770.

The method of some embodiments may therefore generally be articulated as including generic operations including determining proximity to pitch resonance based on pitch information, ride height information and vehicle speed for the vehicle. The method may further include determining traction torque or braking torque to apply to increase proximity to pitch resonance, and applying the traction torque or the braking torque to selected wheels of the vehicle responsive to counteract pitch. This basic method may include additional steps, modifications, augmentations and/or the like to achieve further objectives or enhance performance of the method. The additional steps, modifications, augmentations and/or the like may be added in any combination with each other. Below is a list of various additional steps, modifications, and augmentations that can each be added individually or in any combination with each other. For example, the method may further include determining a type of road surface and enabling applying the traction torque or the braking torque only when the road surface is an off-road surface. In an example embodiment, the method may further include determining whether the pitch information and vehicle speed are in an enabling range prior to determining the traction torque or braking torque. In some cases, determining proximity to pitch resonance may include either determining current proximity to, or an estimated future proximity to, an absolute position of one or more wheels relative to a range of travel between maximum compression and maximum rebound positions, or a motion transition point defining a change from rebound to compression, or defining a point of maximum compression or maximum rebound. In an example embodiment, applying the traction torque or the braking torque may include generating a propulsive torque intervention or a braking torque intervention, respectively, on a wheel-by-wheel basis based on values defined in a lookup table for the ride height information and the pitch information associated with each respective one of the selected wheels at respective given vehicle speeds.

Example embodiments may provide improved traction control and enable higher speeds over whoops while enjoying improved comfort and a greater confidence in the feel of the ride. Example embodiments may also provide improved yaw stability and avoidance of coming into proximity to conditions where pitch resonance may be reached. Moreover, in certain modes that may be selectable by the operator (e.g., an off-road traction control mode), the method above may be automatically executed without further input or interaction from the driver to operate additively with other driver inputs relative to speed and braking. In this regard, sensor information may be gathered from various sensors while the off-traction control mode is selected. Based on the sensor information, the controller will apply brake forces and traction forces in antiphase with the pitch resonance therefore increasing pitch damping and increasing acceleration capability ultimately allowing the vehicle to accelerate outside the pitch resonance speed range as quickly as possible.

A vehicle control system for improving traction of a vehicle may therefore be provided. The vehicle control system includes a plurality of sensors that determine ride height information of a vehicle, a sensor that determines pitch information for the vehicle, and a controller that selectively applies traction torque and braking torque to wheels of the vehicle based on vehicle speed, the pitch information and the ride height information.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the controller may apply the traction torque or the braking torque responsive to a current determination of proximity to pitch resonance, or to an estimated future proximity to pitch resonance. The proximity to pitch resonance may be determined based on an absolute position of a corresponding one of the wheels relative to a range of travel between maximum compression and maximum rebound positions, or to a motion transition point defining a change from rebound to compression, or defining a point of maximum compression or maximum rebound. In an example embodiment, the ride height information may include an indication of absolute position of a corresponding one of the wheels relative to a range of travel between maximum compression and maximum rebound positions. In such an example, the controller may be configured to provide the braking torque or the traction torque based on proximity to the absolute position of the corresponding one of the individual wheels. In an example embodiment, the ride height information may include an indication of a motion transition point defining a change from rebound to compression, or defining a point of maximum compression or maximum rebound. In such an example, the controller may be configured to provide the braking torque or the traction torque based on proximity to the motion transition point. In some examples, the ride height information may include an indication of damper speed, damper acceleration, spring force or damper force. In such examples, the controller may be configured to provide the braking torque or the traction torque based on the damper speed, the damper acceleration, the spring force or the damper force. In an example embodiment, the controller may include processing circuitry having a processor and memory. The memory may store a lookup table, and the braking torque and the traction torque may be generated on a wheel-by-wheel basis to counteract a direction (and sometimes also the magnitude or a portion thereof) of pitch of the vehicle based on values defined in the lookup table for the pitch information and the ride height information associated with each respective one of the wheels at respective given vehicle speeds. In an example embodiment, the controller may be further configured to generate the braking torque or the traction torque based on a determination of a type of road surface on which the vehicle is operating. In some cases, the controller may be further configured to determine the type of road surface based on terrain information from a lidar detector or from GPS location information for the vehicle. In some cases, the controller may be operable responsive to activation of a traction control mode at a driver interface, and the braking torque or the traction torque may be provided automatically and without driver input when the traction control mode is activated. In an example embodiment, the braking torque and the traction torque are applied as a supplement to (e.g., additive with) brake and propulsion inputs from a driver via a brake pedal and accelerator pedal, respectively.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle control system comprising:
a plurality of sensors that determine ride height information of a vehicle;
a sensor that determines pitch information for the vehicle; and
a controller that selectively applies traction torque and braking torque to wheels of the vehicle based on vehicle speed, the pitch information and the ride height information,
wherein the controller applies the traction torque or the braking torque responsive to a determination of a current proximity to pitch resonance.

2. The system of claim 1, wherein the controller applies the traction torque or the braking torque responsive to a determination of an estimated future proximity to pitch resonance.

3. The system of claim 1, wherein the ride height information comprises an indication of absolute position of a corresponding one of the wheels relative to a range of travel between maximum compression and maximum rebound positions.

4. The system of claim 3, wherein the controller is configured to provide the braking torque or the traction torque based on proximity to the absolute position of the corresponding one of the individual wheels.

5. The system of claim 1, wherein the ride height information comprises an indication of a motion transition point defining a change from rebound to compression, or defining a point of maximum compression or maximum rebound.

6. The system of claim 5, wherein the controller is configured to provide the braking torque or the traction torque based on proximity to the motion transition point.

7. The system of claim 1, wherein the ride height information comprises an indication of damper speed, damper acceleration, spring force or damper force.

8. The system of claim 7, wherein the controller is configured to provide the braking torque or the traction torque based on the damper speed, the damper acceleration, the spring force or the damper force.

9. The system of claim 1, wherein the controller comprises processing circuitry including a processor and memory, the memory storing a lookup table, and
wherein the braking torque and the traction torque are generated on a wheel-by-wheel basis to counteract a direction of pitch of the vehicle based on values defined in the lookup table for the pitch information and the ride height information associated with each respective one of the wheels at respective given vehicle speeds.

10. The system of claim 9, wherein the controller is further configured to generate the braking torque or the traction torque based on a determination of a type of road surface on which the vehicle is operating.

11. The system of claim 10, wherein the controller is further configured to determine the type of road surface based on terrain information from a lidar detector or from global positioning system (GPS) location information for the vehicle.

12. The system of claim 9, wherein the controller is operable responsive to activation of a traction control mode at a driver interface, and wherein the braking torque or the traction torque are provided automatically and without driver input when the traction control mode is activated.

13. The system of claim 12, wherein the braking torque and the traction torque are applied as a supplement to brake and propulsion inputs from a driver via a brake pedal and accelerator pedal, respectively.

14. A method of automatically applying traction control for a suspension system of a vehicle, the method comprising:
determining proximity to pitch resonance based on pitch information, ride height information and vehicle speed for the vehicle;
determining traction torque or braking torque to apply to increase proximity to pitch resonance; and
applying the traction torque or the braking torque to selected wheels of the vehicle responsive to counteract pitch.

15. The method of claim 14, further comprising determining a type of road surface and enabling applying the traction torque or the braking torque only when the road surface is an off-road surface.

16. The method of claim 14, further comprising determining whether the pitch information and vehicle speed are in an enabling range prior to determining the traction torque or braking torque.

17. The method of claim 14, wherein determining proximity to pitch resonance includes determining proximity to:
an absolute position of one or more wheels relative to a range of travel between maximum compression and maximum rebound positions, or
a motion transition point defining a change from rebound to compression, or defining a point of maximum compression or maximum rebound.

18. The method of claim 14, wherein determining proximity to pitch resonance includes determining an estimated future proximity to:
an absolute position of one or more wheels relative to a range of travel between maximum compression and maximum rebound positions, or
a motion transition point defining a change from rebound to compression, or defining a point of maximum compression or maximum rebound.

19. The method of claim 14, wherein applying the traction torque or the braking torque comprises generating a propulsive torque intervention or a braking torque intervention, respectively, on a wheel-by-wheel basis based on values defined in a lookup table for the ride height information and the pitch information associated with each respective one of the selected wheels at respective given vehicle speeds.

20. A vehicle control system comprising:
a plurality of sensors that determine ride height information of a vehicle;
a sensor that determines pitch information for the vehicle; and
a controller that selectively applies traction torque and braking torque to wheels of the vehicle based on vehicle speed, the pitch information and the ride height information,
wherein the ride height information comprises an indication of absolute position of a corresponding one of the wheels relative to a range of travel between maximum compression and maximum rebound positions.

* * * * *